US012580750B2

(12) United States Patent
Griffin et al.

(10) Patent No.: US 12,580,750 B2
(45) Date of Patent: Mar. 17, 2026

(54) MEDIA STREAM TRANSMISSION PROTECTION THROUGH QKD NETWORKS

(71) Applicant: Red Hat, Inc., Raleigh, NC (US)

(72) Inventors: Leigh Griffin, Waterford (IE); Stephen Coady, Dublin (IE)

(73) Assignee: Red Hat, LLC, Raleigh, NC (US)

( * ) Notice: Subject to any disclaimer, the term of this patent is extended or adjusted under 35 U.S.C. 154(b) by 229 days.

(21) Appl. No.: 18/190,339

(22) Filed: Mar. 27, 2023

(65) Prior Publication Data

US 2024/0333483 A1 Oct. 3, 2024

(51) Int. Cl.
*H04L 9/08* (2006.01)

(52) U.S. Cl.
CPC .................................. *H04L 9/0852* (2013.01)

(58) Field of Classification Search
CPC ...................................................... H04L 9/0852
See application file for complete search history.

(56) References Cited

U.S. PATENT DOCUMENTS

| | | | |
|---|---|---|---|
| 9,280,337 | B2 | 3/2016 | Palaniappan |
| 10,389,525 | B2 | 8/2019 | Fu et al. |
| 10,552,138 | B2 | 2/2020 | Smith et al. |
| 10,574,461 | B2 | 2/2020 | Hughes et al. |
| 10,609,079 | B2 | 3/2020 | Crabtree et al. |
| 10,715,335 | B2 | 7/2020 | Schulz et al. |
| 10,756,826 | B1 | 8/2020 | Coady et al. |
| 11,133,823 | B2 | 9/2021 | Griffin et al. |
| 11,218,471 | B1 | 1/2022 | Stapleton et al. |
| 11,258,580 | B2 | 2/2022 | Griffin et al. |
| 11,516,190 | B1 | 11/2022 | McCarty et al. |

(Continued)

FOREIGN PATENT DOCUMENTS

| | | |
|---|---|---|
| CN | 207083180 | 3/2018 |
| CN | 207083180 U | 3/2018 |

(Continued)

OTHER PUBLICATIONS

Divincenzo et al., "Hiding Quantum Data", arXiv:quant-ph/0207147, https:doi.org/10.48550/arXiv.quant-ph/0207147, Jul. 25, 2002, 14 pages.

(Continued)

*Primary Examiner* — Vu V Tran
(74) *Attorney, Agent, or Firm* — Dority & Manning, P.A.

(57) ABSTRACT

A quantum computing device determines that an eavesdropper has attempted to intercept a key on a first quantum communication channel that is using a first quantum key distribution (QKD) protocol, wherein media is being transmitted over the first quantum communication channel between a first entity and a second entity. The quantum computing device accesses a data structure comprising a plurality of rules, each rule identifying an action to take based on an amount of a key detected by an eavesdropper and a type of media being transmitted over the first quantum communication channel. The quantum computing device obtains, based on an amount of the key detected by the eavesdropper and a type of the media, a rule from among the plurality of rules in the data structure. The quantum computing device performs, based on the rule, an action that protects the media before the key is invalidated.

20 Claims, 8 Drawing Sheets

(56)　　　　　References Cited

U.S. PATENT DOCUMENTS

| | | | |
|---|---|---|---|
| 2020/0366316 A1 | 11/2020 | Griffin et al. | |
| 2021/0105130 A1* | 4/2021 | Griffin | H04L 63/107 |
| 2022/0215279 A1 | 7/2022 | Rahman | |
| 2022/0224458 A1* | 7/2022 | Lee | H04L 1/203 |
| 2022/0247549 A1 | 8/2022 | Griffin et al. | |
| 2024/0089092 A1 | 3/2024 | Septon et al. | |
| 2024/0265096 A1 | 8/2024 | Ikram et al. | |
| 2025/0187957 A1 | 6/2025 | Uchida et al. | |

FOREIGN PATENT DOCUMENTS

| | | |
|---|---|---|
| CN | 112260827 | 1/2021 |
| CN | 112260827 A | 1/2021 |
| CN | 111464291 | 6/2021 |
| CN | 111464291 B | 6/2021 |
| CN | 112911225 | 1/2022 |
| CN | 112911225 B | 1/2022 |
| KR | 102341801 | 12/2021 |
| KR | 102341801 B1 | 12/2021 |
| WO | 2012089711 A1 | 7/2012 |
| WO | WO2012089711 | 7/2012 |

OTHER PUBLICATIONS

Lupo et al., "Quantum Data Hiding in the Presence of Noise", Institute of Electrical and Electronics Engineers Transaction on Information Theory, https://ieeexplore.ieee.org/ielaam/18/7473802/7450650-aam.pdf, Jul. 2015, 12 pages.

Non-Final Office Action for U.S. Appl. No. 17/945,531, dated Aug. 27, 2024, 39 pages.

Odedoyin et al., "A Quantum Cryptography Protocol for Access Control in Big Data", International Journal on Cryptography and Information Security (IJCIS), vol. 8, No. 2, Jun. 2018, 12 pages.

Ozols, Quantum Computing—Lecture 5—Quantum Information Processing Protocols, University of Cambridge, Computer Labora-tory, Quantum Computing Course Materials, https://www.cl.cam.ac.uk/teaching/1617/QuantComp/slides5.pdf, 2016, 10 pages.

Pattaranantakul et al., "Efficient Key Management Protocol for Secure RTMP Video Streaming Toward Trusted Quantum Net-work", ETRI Journal, vol. 37, No. 4, http://dx.doi.org/10.4218/etrij, Aug. 2015, 11 pages.

Price et al., "A Quantum Key Distribution Protocol for Rapid Denial of Service Detection", EPJ Quantum Technology, arXiv:1707.03331, https://doi.org/10.1140/epjqt/s40507-020-00084-6, 2020, 20 pages.

Pattaranantakul, Montida, et al., "Efficient Key Management Pro-tocol for Secure RTMP Video Streaming toward Trusted Quantum Network," ETRI Journal, vol. 37, No. 4, http://dx.doi.org/10.4218/etrij, Aug. 2015, 11 pages.

Odedoyin, Abiodun O., et al., "A Quantum Cryptography Protocol for Access Control in Big Data," International Journal on Cryptog-raphy and Information Security (IJCIS), vol. 8, No. 2, Jun. 2018, 12 pages.

Price, Alasdair B., et al., "A quantum key distribution protocol for rapid denial of service detection," EPJ Quantum Technology, arXiv:1707.03331 [quant-ph], https://doi.org/10.1140/epjqt/s40507-020-00084-6, 2020, 20 pages.

Divincenzo, David P., et al., "Hiding Quantum Data," arXiv:quant-ph/0207147, https://doi.org/10.48550/arXiv.quant-ph/0207147, Jul. 25, 2002, 14 pages.

Lupo, Cosmo, et al., "Quantum data hiding in the presence of noise," IEEE Transactions on Information Theory, https://ieeexplore.ieee.org/ielaam/18/7473802/7450650-aam.pdf, Jul. 2015, 12 pages.

Ozols, Maris, "Quantum Computing—Lecture 5—Quantum Infor-mation Processing Protocols," University of Cambridge, Computer Laboratory, Quantum Computing course materials, https://www.cl.cam.ac.uk/teaching/1617/QuantComp/slides5.pdf, 2016, 10 pages.

Final Office Action for U.S. Appl. No. 17/945,531 dated Feb. 26, 2025, 46 pages.

Non-final Office Action for U.S. Appl. No. 17/945,531 dated Jan. 21, 2026, 57 pages.

* cited by examiner

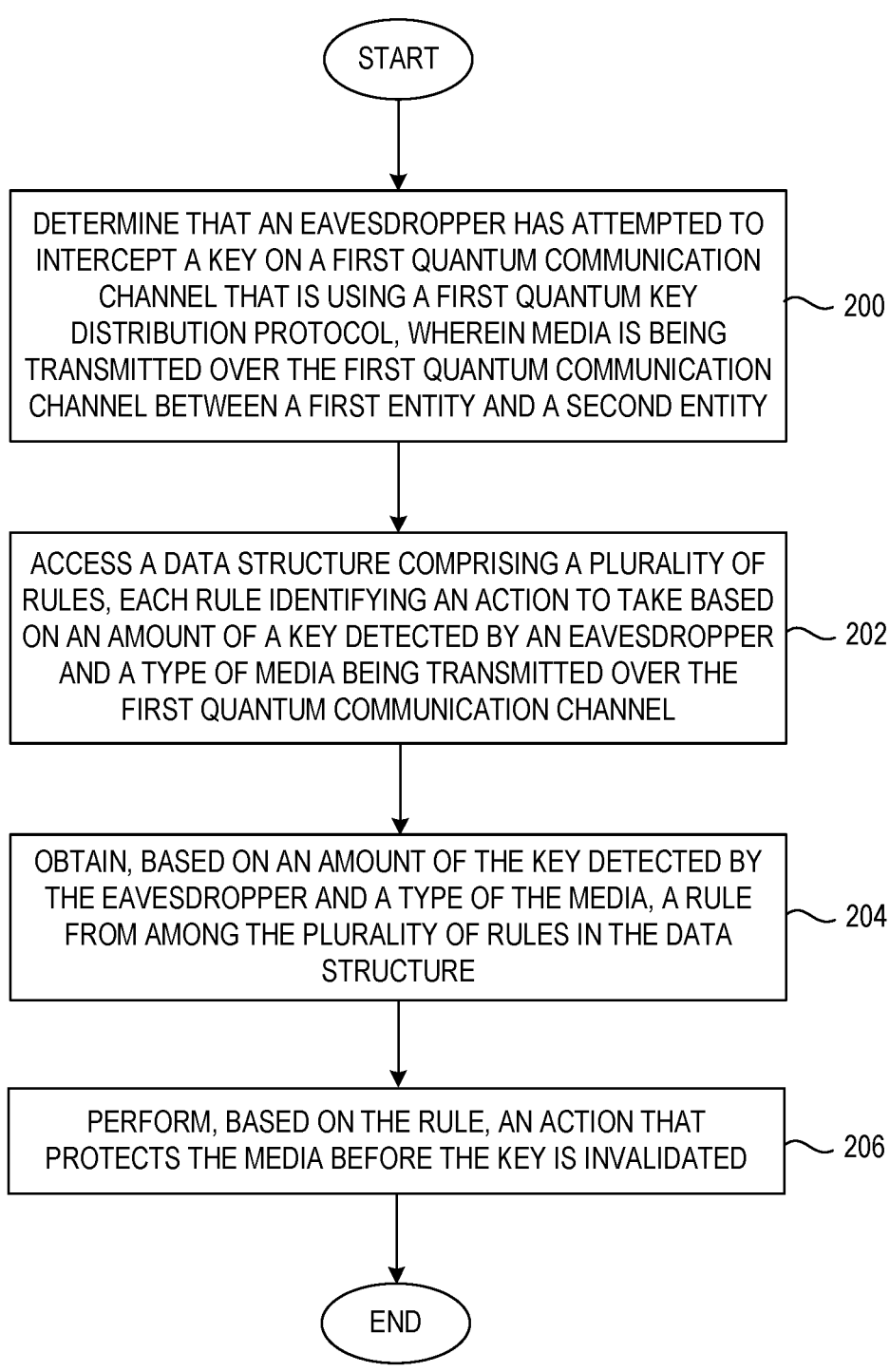

START

DETERMINE THAT AN EAVESDROPPER HAS ATTEMPTED TO INTERCEPT A KEY ON A FIRST QUANTUM COMMUNICATION CHANNEL THAT IS USING A FIRST QUANTUM KEY DISTRIBUTION PROTOCOL, WHEREIN MEDIA IS BEING TRANSMITTED OVER THE FIRST QUANTUM COMMUNICATION CHANNEL BETWEEN A FIRST ENTITY AND A SECOND ENTITY ⌐ 200

ACCESS A DATA STRUCTURE COMPRISING A PLURALITY OF RULES, EACH RULE IDENTIFYING AN ACTION TO TAKE BASED ON AN AMOUNT OF A KEY DETECTED BY AN EAVESDROPPER AND A TYPE OF MEDIA BEING TRANSMITTED OVER THE FIRST QUANTUM COMMUNICATION CHANNEL ⌐ 202

OBTAIN, BASED ON AN AMOUNT OF THE KEY DETECTED BY THE EAVESDROPPER AND A TYPE OF THE MEDIA, A RULE FROM AMONG THE PLURALITY OF RULES IN THE DATA STRUCTURE ⌐ 204

PERFORM, BASED ON THE RULE, AN ACTION THAT PROTECTS THE MEDIA BEFORE THE KEY IS INVALIDATED ⌐ 206

END

*FIG. 2*

MEDIA STREAM TRANSMISSION PROTECTION THROUGH QKD NETWORKS

BACKGROUND

Quantum computing involves the use of quantum bits, referred to herein as "qubits," which have characteristics that differ from those of classical (i.e., non-quantum) bits used in classical computing. Qubits may be employed by quantum services that are executed by quantum computing devices. As quantum computing continues to increase in popularity and become more commonplace, an ability to protect media transmissions over quantum channels will be desirable.

SUMMARY

The examples disclosed herein implement a media protection service that performs media stream transmission protection through quantum key distribution (QKD) networks. In particular, the media protection service can identify an amount of a key detected by an eavesdropper, where the key is being used on a quantum communication channel that is using a QKD protocol, and make a failover decision to be able to transmit media between entities on the quantum communication channel before the key is invalidated. The media protection service can access a table with rules that identify a failover action to take based on the amount of the key that was detected by the eavesdropper and the type of media transmitted over the quantum communication channel. The failover action can then be performed in order to protect the media transmitted over the quantum communication channel before the key becomes invalidated as a result of the eavesdropper.

In one example, a method for media stream transmission protection through QKD networks is disclosed. The method includes determining, by a quantum computing device, that an eavesdropper has attempted to intercept a key on a first quantum communication channel that is using a first QKD protocol, wherein media is being transmitted over the first quantum communication channel between a first entity and a second entity. The method further includes accessing, by the quantum computing device, a data structure comprising a plurality of rules, each rule identifying an action to take based on an amount of a key detected by an eavesdropper and a type of media being transmitted over the first quantum communication channel. The method further includes obtaining, by the quantum computing device based on an amount of the key detected by the eavesdropper and a type of the media, a rule from among the plurality of rules in the data structure. The method further includes performing, by the quantum computing device based on the rule, an action that protects the media before the key is invalidated.

In another example, a quantum computing device for media stream transmission protection through QKD networks is disclosed. The quantum computing device comprises a system memory, and a processor device communicatively coupled to the system memory. The processor device is to determine that an eavesdropper has attempted to intercept a key on a first quantum communication channel that is using a first quantum key distribution (QKD) protocol, wherein media is being transmitted over the first quantum communication channel between a first entity and a second entity. The processor device is further to access a data structure comprising a plurality of rules, each rule identifying an action to take based on an amount of a key detected by an eavesdropper and a type of media being transmitted over the first quantum communication channel.

The processor device is further to obtain, based on an amount of the key detected by the eavesdropper and a type of the media, a rule from among the plurality of rules in the data structure. The processor device is further to perform, based on the rule, an action that protects the media before the key is invalidated.

In another example, a non-transitory computer-readable storage medium is disclosed. The non-transitory computer-readable storage medium stores thereon computer-executable instructions that, when executed, cause one or more processor devices to determine that an eavesdropper has attempted to intercept a key on a first quantum communication channel that is using a first quantum key distribution (QKD) protocol, wherein media is being transmitted over the first quantum communication channel between a first entity and a second entity. The instructions further cause the processor device to access a data structure comprising a plurality of rules, each rule identifying an action to take based on an amount of a key detected by an eavesdropper and a type of media being transmitted over the first quantum communication channel. The instructions further cause the processor device to obtain, based on an amount of the key detected by the eavesdropper and a type of the media, a rule from among the plurality of rules in the data structure. The instructions further cause the processor device to perform, based on the rule, an action that protects the media before the key is invalidated.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a flowchart illustrating operations performed by the quantum computing system of FIG. 1 for media stream transmission protection through QKD networks, according to one example

DETAILED DESCRIPTION

Figure 1:
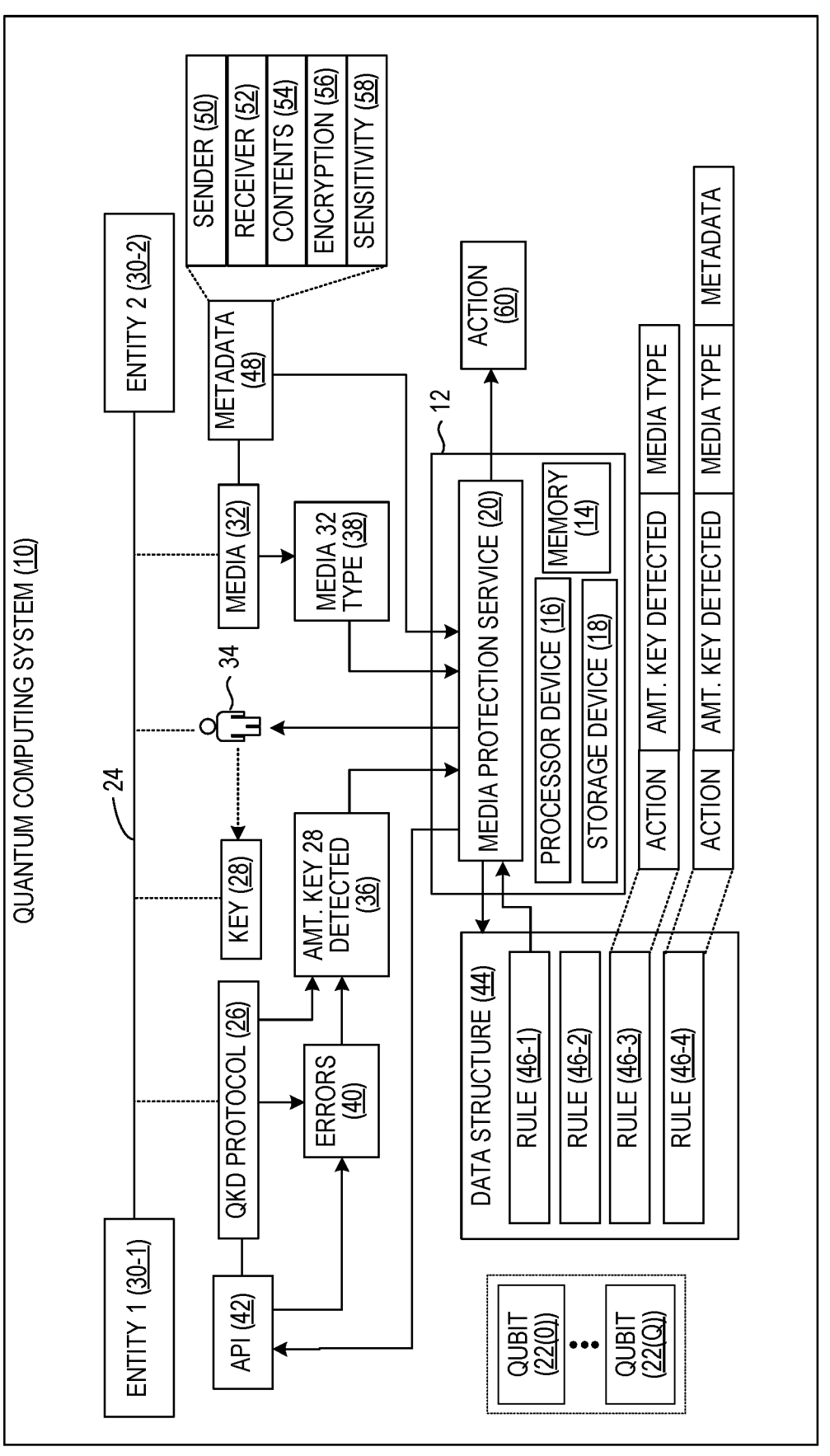
FIG. 1 is a block diagram of a quantum computing system in which examples of media stream transmission protection through QKD networks may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first executing quantum service" and "second executing quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

Quantum computing involves the use of quantum bits, referred to herein as "qubits," which have characteristics that differ from those of classical (i.e., non-quantum) bits used in classical computing. Qubits may be employed by quantum services that are executed by quantum computing devices.

Media transfers between entities over a quantum communication channel have uptime and redundancy requirements. Quantum key distribution (QKD) protocols can protect quantum communication channels that transfer media between entities, however, a key generated by the QKD protocol and shared between the entities can be invalidated if detected by an intruder. Once the key is invalidated, the media transfer over the quantum communication channel fails, as entities can no longer communicate once the key is invalidated.

The examples utilize a media protection service that provides for redundancy mechanisms that can be used to transition the media transfer before the key is invalidated. The media protection service can detect how much of the key was detected and use the amount of the key that was detected and the type of the media being transmitted over the quantum communication channel to look up threshold-based rules. The rules determine a failover action to take in order to preserve the media transfer before the key is invalidated, as invalidation of the key can cause the entities to no longer be able to communicate. For instance, other quantum communication channels, QKD protocols, or encryption types can be provided for in the rules and the media protection service can transition the media stream to another quantum communication channel or QKD protocol before the key is invalidated, thereby allowing the media to continue to be transmitted between the entities without interruption.

QKD protocols allow for the generation of a secret key that is known only to the party that generated the key. The key can be used by an encryption algorithm to encrypt or decrypt data transferred over the quantum communication channel. The BB84 protocol is one example of a QKD protocol that uses a quantum communication channel and at least two qubits. A QKD protocol, such as the BB84 protocol, can detect an eavesdropper intruding on the quantum communication channel by discovering errors introduced into the key. The media protection service can determine how much of the key was detected by the eavesdropper by using this error count, which can be used in combination with the media type in order to look up the rules and perform a failover action indicate in a corresponding rule.

FIG. 1 is a block diagram of a quantum computing system in which examples of media stream transmission protection through quantum key distribution (QKD) networks may be practiced. In the example of FIG. 1, quantum computing system 10 includes a quantum computing device 12 that comprises a system memory 14, a processor device 16, and a storage device 18. It is to be understood that the quantum computing system 10 in some examples may include constituent elements in addition to those illustrated in FIG. 1. In the example of FIG. 1, the quantum computing device 12 implements a media protection service 20 that performs media stream transmission protection through QKD networks.

The quantum computing system 10 includes a set of one or more qubits 22(0)-22(Q) and a quantum communication channel 24. The set of one or more qubits 22(0)-22(Q) may be utilized by quantum services executed in the quantum computing system 10, such as the media protection service 20. Quantum services, such as the media protection service 20, are processes that employ qubits, such as the set of one or more qubits 22(0)-22(Q), to provide desired functionality. The quantum communication channel 24 may utilize a QKD protocol 26, such as, by way of non-limiting example, a BB84 QKD protocol. The QKD protocol 26 may be used in conjunction with the qubits 22(0)-22(Q) and the quantum communication channel 24 to generate a key 28.

The quantum computing system 10 includes a first entity 30-1 and a second entity 30-2 that can transmit media 32 to one another over the quantum communication channel 24. The first entity 30-1 may include a quantum computing device or a classical computing device and the second entity 30-2 may include a quantum computing device or a classical computing device. The media 32 transmitted over the quantum communication channel 24 may be a file, a video stream, a voice stream, or any network transmissible entity, as non-limiting examples. The key 28 may be transmitted over the quantum communication channel 24 that is using the QKD protocol 26 and transmitting the media 32 between the first entity 30-1 and the second entity 30-2. The key 28 can be used to encrypt or decrypt the media 32 being transmitted over the quantum communication channel 24 between the first entity 30-1 and the second entity 30-2.

The media protection service 20 may determine that an eavesdropper 34 has attempted to intercept the key 28 as the media 32 is being transmitted over the quantum communication channel 24 between the first entity 30-1 and the second entity 30-2. When errors in the quantum computing system 10 or the key 28 are detected, that indicates that a third party has detected a qubit, so the media protection service 20 can determine the presence of the eavesdropper 34 based on the presence of the errors. For instance, one entity can send a qubit spin up and a second entity can receive the qubit as spin down, which is an error, and the presence of that error can indicate that a third party has detected the qubit.

The media protection service 20 can determine the amount 36 of the key 28 that was detected by the eavesdropper 34 and the type 38 of the media 32 that is being transmitted over the quantum communication channel 24 after determining that the eavesdropper 34 has attempted to intercept the key 28. The media protection service 20 can determine an amount 36 of the key 28 that was detected by the eavesdropper 34 and determine a type 38 of the media 32 that is being transmitted over the quantum communication channel 24. For example, the media protection service 20 may determine that the amount 36 of the key 28 that was detected by the eavesdropper 34 is 10% of the key 28 and the type 38 of the media 32 that is being transmitted over the quantum communication channel 24 is a PDF file.

In some implementations, the media protection service 20 can determine the amount 36 of the key 28 that was detected by the eavesdropper 34 by obtaining an amount of errors 40 introduced into the key 28. The media protection service 20 can obtain the amount of the errors 40 introduced into the key 28 from the QKD protocol 26, such as by a message or notification from the QKD protocol 26, as non-limiting examples. The QKD protocol 26 can send real-time information to the media protection service 20 that indicates the amount of errors 40 introduced into the key 28. The information from the QKD protocol 26 about the amount of errors 40 introduced into the key 28 allows the media protection service 20 to continually monitor the error count and perform a failover action before the key 28 is invalidated, as once a certain amount of the key 28 is detected by the eavesdropper 34, the key 28 will be invalidated and the first entity 30-1 and the second entity 30-2 will not be able to communicate or transmit the media 32 over the quantum communication channel 24.

In other implementations, the media protection service 20 can determine the amount 36 of the key 28 that was detected by the eavesdropper 34 by obtaining the amount 36 of the key 28 that was detected by the eavesdropper 34 as a percentage from the QKD protocol 26, such as by a message or notification from the QKD protocol 26, as non-limiting examples. In some implementations, the media protection service 20 can determine the amount 36 of the key 28 that was detected by the eavesdropper 34 by sending a request to an application programming interface (API) 42 that corresponds to the QKD protocol 26. The request to the API 42 may be a request for an amount of errors introduced into the key 28. The media protection service 20 can receive the amount of errors 40 introduced into the key 28 from the API 42 that corresponds to the QKD protocol 26. The amount 36 of the key 28 that was detected by the eavesdropper 34 can be based on the amount of errors 40 introduced into the key 28. The request to the API 42 may be a request for an amount of the key that was detected by the eavesdropper 34, such as a percentage of the key that was detected, and the media protection service 20 can receive the amount 36 of the key 28 detected by the eavesdropper 34 from the API 42. For instance, the QKD protocol 26 may have a mechanism that informs the media protection service 20, such as upon a request to the QKD protocol 26 or the API 42, of what the error was, the percentage of the key 28 that was invalidated, or the amount or percentage of the key 28 that was assessed by the eavesdropper 34.

The quantum computing system 10 includes a data structure 44 that includes rules 46-1, 46-2, 46-3, 46-4, each rule identifying an action to take based on an amount of a key detected by an eavesdropper and a type of media being transmitted over the quantum communication channel 24. The amount of a key detected by an eavesdropper that is in a rule may be represented as a percentage of a key that is detected, where a percentage higher than the percentage indicated in the rule causes invalidation of the key because that means that the eavesdropper has assessed too much of the key to make the key secure, therefore the failover action indicated in the rule should occur at or before the percentage in the rule is met. The media protection service 20 may continually monitor for the percentage of the key 28 that has been detected by the eavesdropper 34, allowing for the failover action indicated in the rule to occur at or before the percentage in the rule is met. The data structure 44 may be a table, as a non-limiting example, and can be stored in a storage device of the quantum computing system 10, such as, by way of non-limiting example, a database.

The media protection service 20 can access the data structure 44 and obtain a rule 46-1 from among the rules 46-1, 46-2, 46-3, 46-4 in the data structure 44 based on the amount 36 of the key 28 that was detected by the eavesdropper 34 and the type 38 of the media 32 that is being transmitted over the quantum communication channel 24. In order to obtain the rule 46-1 from the data structure 44, the media protection service 20 may identify that the rule 46-1 in the data structure 44 contains a type of media and an amount of a key detected by an eavesdropper that match the type 38 of the media 32 that is being transmitted over the quantum communication channel 24 and the amount 36 of the key 28 that was detected by the eavesdropper 34 respectively. As one example, the data structure 44 may be a table with rows and columns, each row being a rule with columns for the type of the media being transmitted over the quantum communication channel 24, the amount of the key that was detected by an eavesdropper, and the action to take when that type of media is being transmitted and that amount of the key was detected. The rules 46-1, 46-2, 46-3, 46-4 in the data structure 44 may be defined by a user of the quantum computing system 10. For instance, the user can define rules that indicate which action to take when a specified amount of a key is detected by an eavesdropper for a type of media being transmitted over a quantum communication channel. In some implementations, the rules 46-1, 46-2, 46-3, 46-4 in the data structure 44 can be defined by a machine learning algorithm that learns based on prior failures of media transfers and amounts of the key that were detected to produce the failures. In other implementations, the rules 46-1, 46-2, 46-3, 46-4 in the data structure 44 can be dynamically updated, such as by the media protection service 20 based on errors detected by the media protection service 20 or the QKD protocol 26.

In some implementations, the media protection service 20 can determine metadata 48 of the media 32 that is being transmitted over the quantum communication channel 24. The metadata 48 may include one or more of a sender 50 (e.g., the first entity 30-1, the second entity 30-2), a receiver 52 (e.g., the first entity 30-1, the second entity 30-2), contents 54, encryption 56, or sensitivity 58 of the media 32, as non-limiting examples. The rules 46-1, 46-2, 46-3, 46-4 included in the data structure 44 can each identify an action to take based on an amount of a key detected by an eavesdropper, a type of media being transmitted over the quantum communication channel 24, and one or more items of metadata of the media being transmitted over the quantum communication channel 24. As one example, the data structure 44 may be a table with rows and columns, each row being a rule with columns for the type of the media being transmitted over the quantum communication channel 24, the amount of the key that was detected by an eavesdropper, the metadata associated with the media being transmitted over the quantum communication channel 24, and the action to take when that type of media is being transmitted, that amount of the key was detected, and the media contains metadata matching the metadata in the rule. Because the rules 46-1, 46-2, 46-3, 46-4 in the data structure 44 may be defined by a user of the quantum computing system 10, the user can define which metadata is more critical. For example, the user can create one rule where the action to take is to switch quantum communication channels when 50% of a key is detected, the media type is a video stream, and the video stream metadata specifies that the video stream is not sensitive, and a second rule where the action to take is to switch quantum communication channels when 10% of a key is detected, the media type is a video stream, and the video stream metadata specifies that the video stream is sensitive. For example, the user can create one rule where the action to take is to switch QKD protocols when 40% of the key is detected, the media type is a file, and the file is being transmitted over the quantum communication channel 24 between the first entity 30-1 and the second entity 30-2 which are in the same organization, and another rule where the action to take is to switch QKD protocols when 20% of the key is detected, the media type is a file, and the file is being transmitted over the quantum communication channel 24 between the first entity 30-1 and the second entity 30-2 which are not in the same organization.

The media protection service 20 can access the data structure 44 and obtain a rule 46-1 from among the rules 46-1, 46-2, 46-3, 46-4 in the data structure 44 based on the amount 36 of the key 28 that was detected by the eavesdropper 34, the type 38 of the media 32 that is being transmitted over the quantum communication channel 24, and one or more items of the metadata 48 of the media 32 being transmitted over the quantum communication channel 24. For example, the media protection service 20 can determine that the amount 36 of the key 28 detected by the eavesdropper 34 is 30% of the key 28, that the type 38 of the media 32 is a text file, and that the metadata 48 of the text file indicates that the text file contains sensitive information such as personally identifiable information. The media protection service 20 can then access the data structure 44 and obtain the rule 46-1 to use where 30% of a key is detected, a type of the media is a text file, and the metadata indicates that the media has sensitive contents.

The media protection service 20 can perform an action 60 that protects the media 32 before the key 28 is invalidated and can no longer be used. The action 60 that is performed is based on the rule 46-1 that was obtained by the media protection service 20 from the data structure 44. For instance, the action 60 may include switching the transmission of the media 32 from the quantum communication channel 24 to a different quantum communication channel, using a different QKD protocol than QKD protocol 26, changing the type of encryption used, or stopping the transmission of the media 32 for a period of time, as non-limiting examples.

For example, the media protection service 20 may determine that the amount 36 of the key 28 that was detected by the eavesdropper 34 is 50% of the key 28, such as by obtaining the amount of errors introduced into the key, and that the type 38 of the media 32 that is being transmitted over the quantum communication channel 24 between the first entity 30-1 and the second entity 30-2 is a PDF file. The media protection service 20 can access the data structure 44 and find a rule from among the rules 46-1, 46-2, 46-3, 46-4 in the data structure 44 that corresponds to a PDF file where 50% of a key was detected. The rule that corresponds to a PDF file where 50% of a key was detected can identify an action to take when a PDF file is being transmitted over the quantum communication channel 24 and 50% of the key was detected. The media protection service 20 may obtain the rule from the data structure 44 that corresponds to a PDF file where 50% of a key was detected and identify that the action 60 to perform is to switch the transmission of the PDF file (e.g., the media 32) to a different quantum communication channel. The media protection service 20 can then switch the transmission of the PDF file (e.g., the media 32) from the quantum communication channel 24 to a different quantum communication channel, thereby allowing the PDF file to continue to be transmitted between the first entity 30-1 and the second entity 30-2 before the key 28 is invalidated.

It is to be understood that, because the media protection service 20 is a component of the quantum computing device 12, functionality implemented by the media protection service 20 may be attributed to the quantum computing device 12 generally. Moreover, in examples where the media protection service 20 comprises software instructions that program the processor device 16 to carry out functionality discussed herein, functionality implemented by the media protection service 20 may be attributed herein to the processor device 16. It is to be further understood that while, for purposes of illustration only, the media protection service 20 is depicted as a single component, the functionality implemented by the media protection service 20 may be implemented in any number of components, and the examples discussed herein are not limited to any particular number of components.

FIG. 2 is a flowchart illustrating operations performed by the quantum computing system of FIG. 1 for media stream transmission protection through QKD networks, according to one example. Elements of FIG. 1 are referenced in describing FIG. 2 for the sake of clarity. In the example of FIG. 2, operations begin with a processor device of a quantum computing device, such as the processor device 16 of the quantum computing device 12 of FIG. 1, to determine that an eavesdropper has attempted to intercept a key on a first quantum communication channel that is using a first quantum key distribution protocol, wherein media is being transmitted over the first quantum communication channel between a first entity and a second entity (block 200). The processor device 16 then accesses a data structure comprising a plurality of rules, each rule identifying an action to take based on an amount of a key detected by an eavesdropper and a type of media being transmitted over the first quantum communication channel (block 202). The processor device 16 then obtains, based on an amount of the key detected by the eavesdropper and a type of the media, a rule from among the plurality of rules in the data structure (block 204). The processor device 16 then performs, based on the rule, an action that protects the media before the key is invalidated (block 206).

Figure 3:
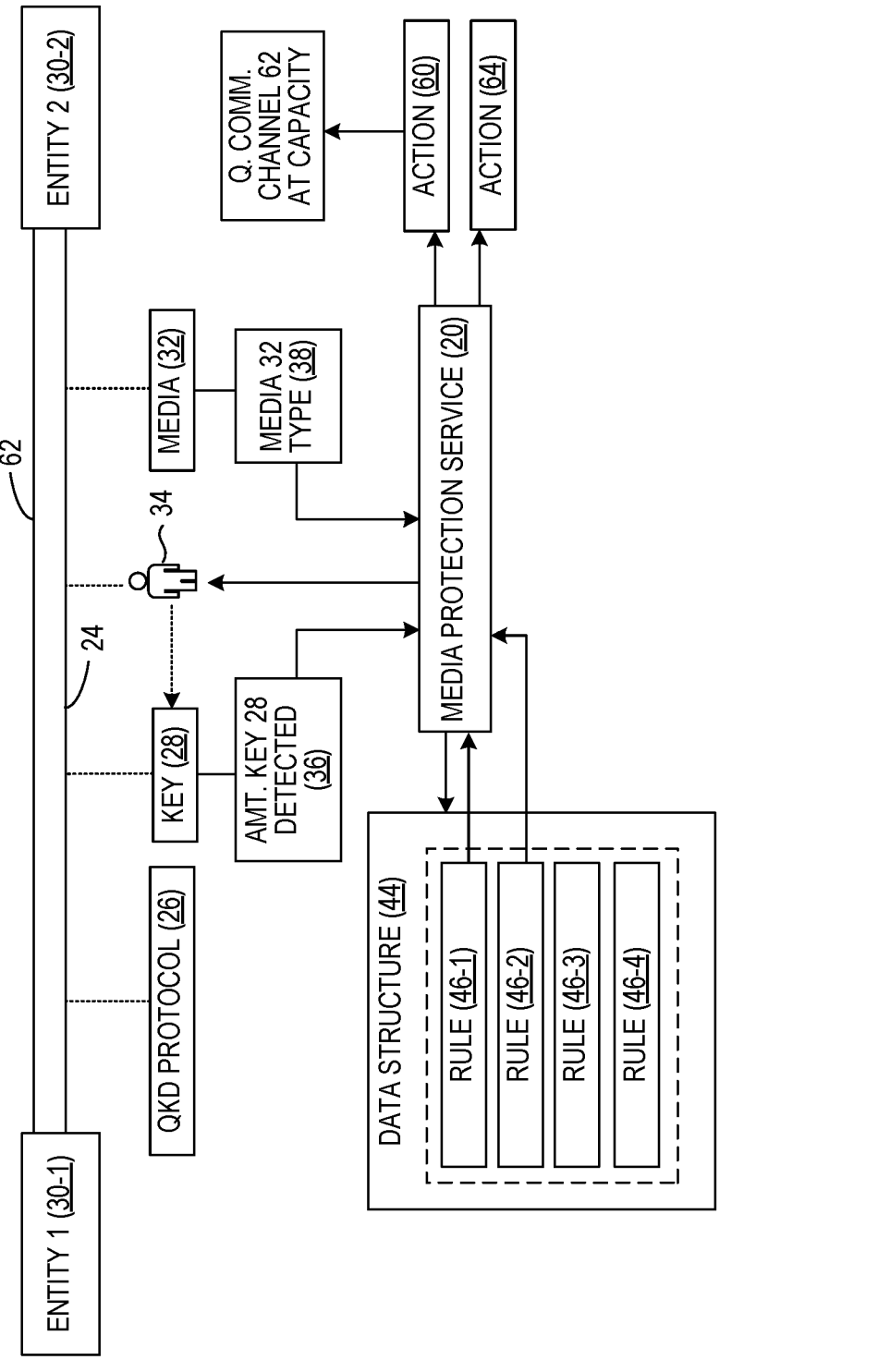
FIG. 3 is a block diagram of the quantum computing system of FIG. 1 for media stream transmission protection through QKD networks, according to one example.

FIG. 3 is a block diagram of the quantum computing system of FIG. 1 for media stream transmission protection through QKD networks, according to one example. Elements of FIG. 1 are referenced in describing FIG. 3 for the sake of clarity. In the example of FIG. 3, the media protection service 20 may obtain the rule 46-1 from among the rules 46-1, 46-2, 46-3, 46-4 in the data structure 44 and then determine that the action 60 identified in the rule 46-1 utilizes a quantum communication channel that is at capacity. For instance, the action 60 may tell the media protection service 20 to use a second quantum communication channel 62 to transmit the media 32 and the second quantum communication channel 62 may be at a capacity level that does not allow the second quantum communication channel 62 to transmit the media 32. The media protection service 20 can then obtain another rule 46-2 from among the rules 46-1, 46-2, 46-3, 46-4 in the data structure 44 that identifies an action 64 to take based on the amount 36 of the key 28 detected and the type 38 of the media 32. The action 64 can then be performed based on the rule 46-2 that was obtained by the media protection service 20 from the data structure 44.

The rules 46-1, 46-2, 46-3, 46-4 in the data structure 44 may be in an ordered list based on priority. As one example, the data structure 44 may be a table with rows and columns, each row being a rule with columns for the type of media being transmitted over the quantum communication channel 24, the amount of the key that was detected by the eavesdropper, and an ordered list of actions to take when that type of media is being transmitted and that amount of the key was detected. In another example, the data structure 44 may be a table with rows and columns, each row being a rule with columns for the type of media being transmitted over the quantum communication channel 24, the amount of the key that was detected by the eavesdropper, one or more items of metadata of the media, and an ordered list of actions to take when that type of media is being transmitted, that amount of the key was detected, and the media has the corresponding metadata. Because the rules 46-1, 46-2, 46-3, 46-4 in the data structure 44 may be defined by a user of the quantum computing system 10, the user can define the priority of the actions to take by setting the order of the actions in the ordered list. For instance, the media protection service 20 may obtain the rule 46-1 that is first in the ordered list of rules based on priority and when the media protection service 20 determines that the action 60 identified in the rule 46-1 cannot be performed, the media protection service 20 can obtain the rule 46-2 because that is second in the ordered list of rules based on priority. If the action 64 based on the rule 46-2 cannot be performed, such as if the rule 46-2 identifies another quantum communication channel to use which is also busy, then the media protection service 20 can obtain rule 46-3 from the data structure 44 based on the amount 36 of the key 28 detected and the type 38 of the media 32, and so on in the ordered list or rules based on priority until an action can be performed that will transition the media 32 before the key 28 is invalidated.

Figure 4:
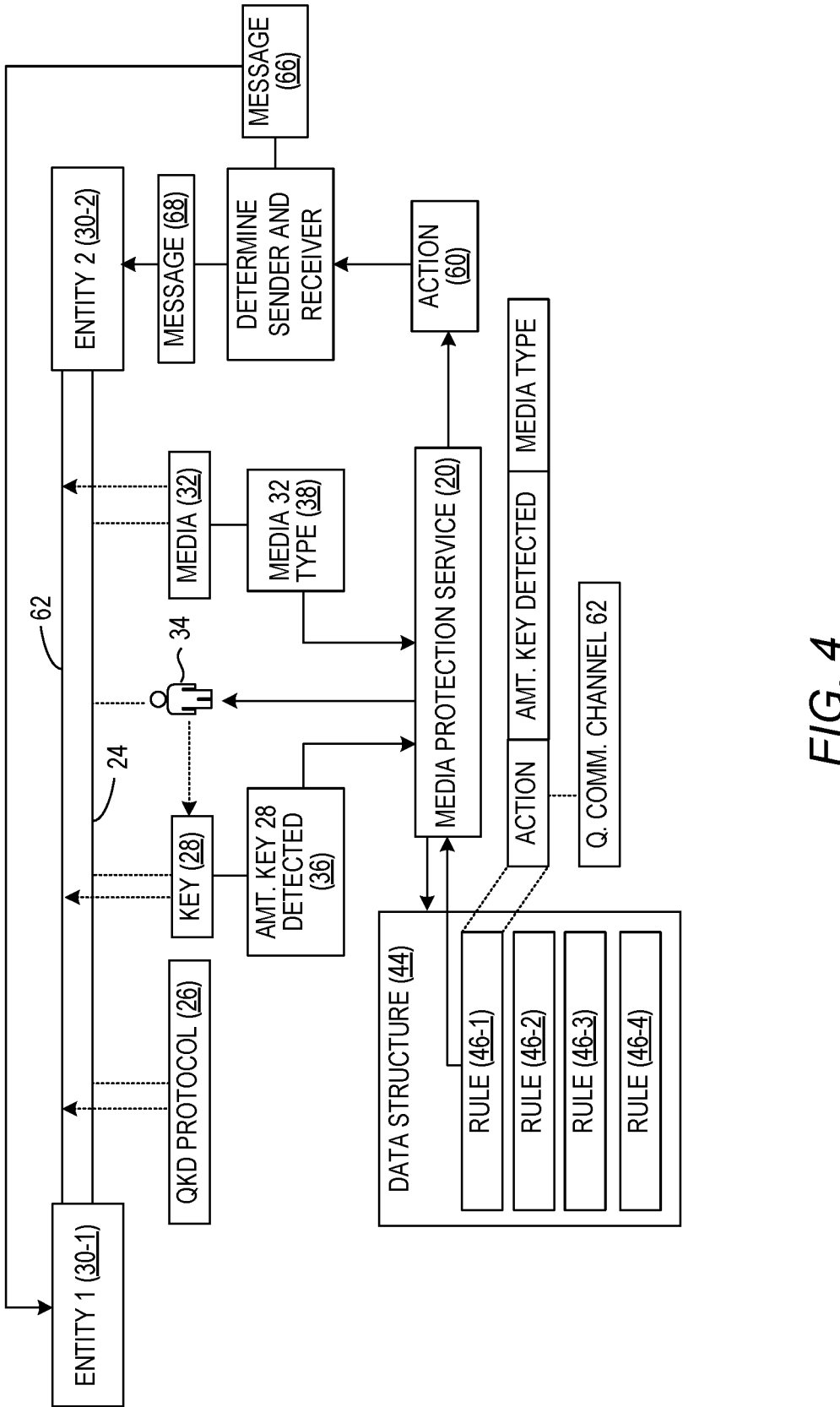
FIG. 4 is a block diagram of the quantum computing system of FIG. 1 for media stream transmission protection through QKD networks, according to one example.

FIG. 4 is a block diagram of the quantum computing system of FIG. 1 for media stream transmission protection through QKD networks, according to one example. Elements of FIG. 1 are referenced in describing FIG. 4 for the sake of clarity. In the example of FIG. 4, the media 32 may be in the process of being transmitted over the quantum communication channel 24 when the media protection service 20 determines that the eavesdropper 34 has attempted to intercept the key 28. The media protection service 20 may perform the action 60 that protects the media 32 before the key 28 is invalidated based on the rule 46-1 that was obtained by the media protection service 20 from the data structure 44. Performing the action 60 may include the media protection service 20 identifying the second quantum communication channel 62 in the rule 46-1 as the quantum communication channel to transmit the media 32 over and transitioning the transmission of the media 32 from the quantum communication channel 24 to the second quantum communication channel 62. The first entity 30-1 and the second entity 30-2 can transmit media to one another over the second quantum communication channel 62. The second quantum communication channel 62 can utilize a QKD protocol, such as the QKD protocol 26, and a key, such as the key 28, or a different QKD protocol and a different key. In some implementations, the media protection service 20 may identify a classical protocol for communication, such as HTTP or an internet protocol suite, or a classical cryptographic protocol, such as TLS, in the rule and transition the transmission of the media 32 from using the quantum communication channel 24 to using the classical protocol or transition the media 32 to use the classical cryptographic protocol. In other implementations, the media protection service 20 may identify another quantum communication protocol, such as superdense coding, to transmit the media 32 and transition the transmission of the media 32 to use the quantum communication protocol identified in the rule.

In some implementations, the media protection service 20 may transition the transmission of the media 32 from the quantum communication channel 24 to the second quantum communication channel 62 by determining a sender of the media 32 and a receiver of the media 32, such as by accessing the metadata 48 of the media 32 as one example. For instance, the first entity 30-1 may be sending the media 32 over the quantum communication channel 24 and the second entity 30-2 may be receiving the media 32 from the first entity 30-1 over the quantum communication channel 24. The media protection service 20 can send a message 66 to the sender of the media 32 over the quantum communication channel 24 and send a message 68 to the receiver of the media 32 over the quantum communication channel 24. The message 66 to the sending entity (e.g., the first entity 30-1) may instruct the sending entity to transition the transmission of the media 32 from the quantum communication channel 24 to the second quantum communication channel 62. The message 68 to the receiving entity (e.g., the second entity 30-2) may instruct the receiving entity to transition from the quantum communication channel 24 to the second quantum communication channel 62 in order to receive the media 32 from the sending entity (e.g., the first entity 30-1). In some examples, the message 66 and the message 68 may be API calls to a service, such as a file transfer service, that tell the service to switch to another classical or quantum communication channel or classical or quantum protocol in order to continue transmitting the media 32 between the first entity 30-1 and the second entity 30-2.

In other implementations, the media protection service 20 may transition the transmission of the media 32 from the quantum communication channel 24 to the second quantum communication channel 62 by determining that a first portion of the media 32 was transmitted over the quantum communication channel 24 between the first entity 30-1 and the second entity 30-2. The media protection service 20 can also determine a second portion of the media 32 that has not yet been transmitted over the quantum communication channel 24 between the first entity 30-1 and the second entity 30-2. The media protection service 20 can transition the transmission of the second portion of the media 32 from the quantum communication channel 24 to the second quantum communication channel 62. The second portion of the media 32 may be transitioned to the second quantum communication channel 62 by sending the message 66 to the sender of the media 32 and the message 68 to the receiver of the media 32, the messages instructing the sender and the receiver to transition the transmission of the media 32 from the quantum communication channel 24 to the second quantum communication channel 62. The media protection service 20 can then transmit the second portion of the media 32 over the second quantum communication channel 62 between the first entity 30-1 and the second entity 30-2.

For example, the media 32 may be a PDF file and 30% of the file may have been transmitted from the first entity 30-1 to the second entity 30-2 over the quantum communication channel 24. The media protection service 20 may determine that the eavesdropper 34 attempted to intercept the key 28 on the quantum communication channel 24 and obtain the rule 46-1 from the data structure 44, and the rule 46-1 may indicate that the action 60 to perform is to transition the transmission of the media 32 from the quantum communication channel 24 to the second quantum communication channel 62. The media protection service 20 may then determine that 30% of the file has been transmitted from the first entity 30-1 to the second entity 30-2 over the quantum communication channel 24 and that the remaining 70% of the file should be transmitted from the first entity 30-1 to the second entity 30-2 over the second quantum communication channel 62. The media protection service 20 can then transition the transmission of the remaining 70% of the file from the quantum communication channel 24 to the second quantum communication channel 62, and the remaining 70% of the file can be transmitted from the first entity 30-1 to the second entity 30-2 over the second quantum communication channel 62. The media protection service 20 can instruct the second quantum communication channel 62 to use the QKD protocol 26 and the key 28 or a different QKD protocol and a different key. After transitioning the transmission of the media 32 from the quantum communication channel 24 to the second quantum communication channel 62, the media protection service 20 can stop the quantum communication channel 24 and stop transmitting media over the quantum communication channel 24.

Figure 5:
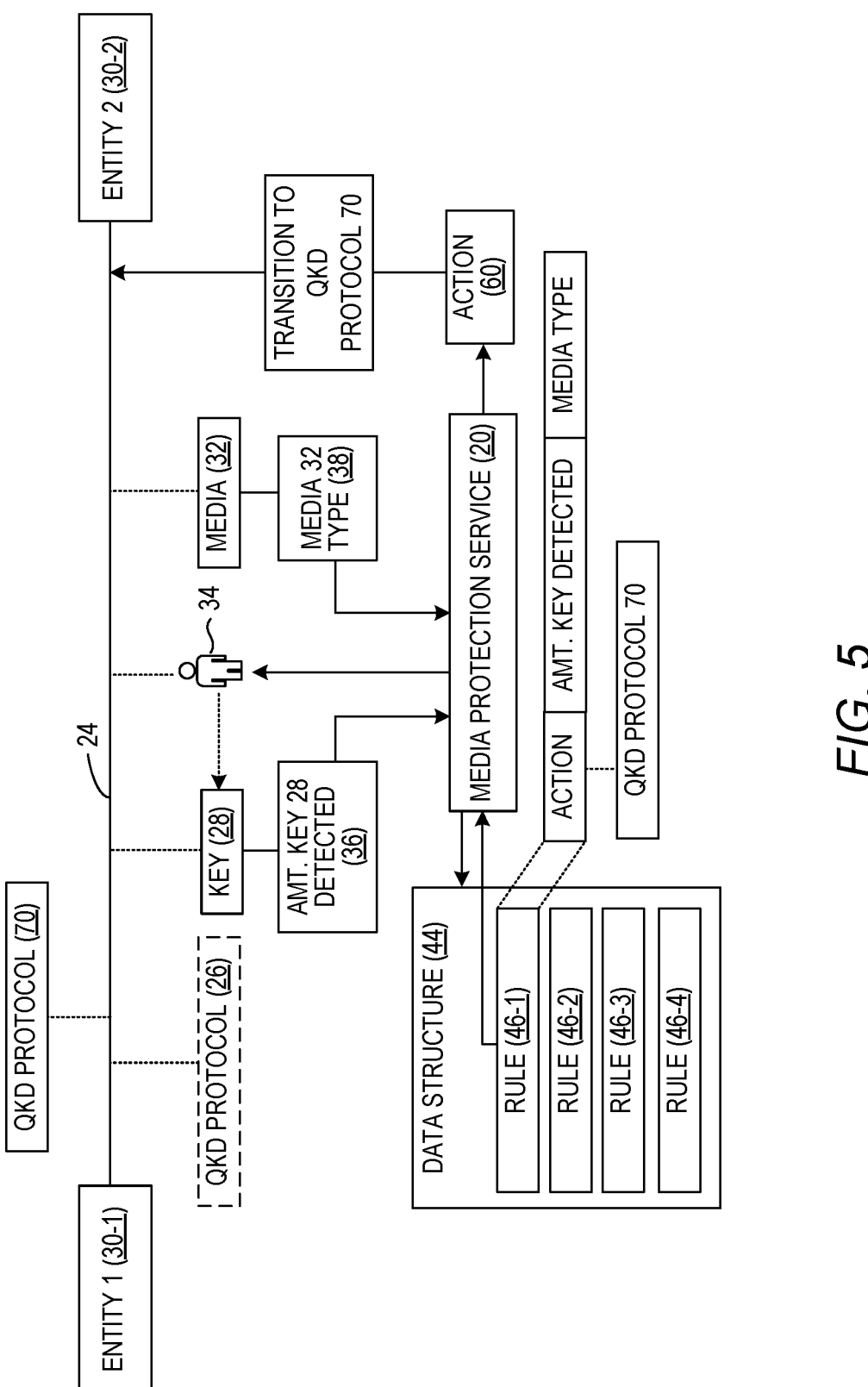
FIG. 5 is a block diagram of the quantum computing system of FIG. 1 for media stream transmission protection through QKD networks, according to one example.

FIG. 5 is a block diagram of the quantum computing system of FIG. 1 for media stream transmission protection through QKD networks, according to one example. Elements of FIG. 1 are referenced in describing FIG. 5 for the sake of clarity. In the example of FIG. 5, the media 32 may be in the process of being transmitted over the quantum communication channel 24 when the media protection service 20 determines that the eavesdropper 34 has attempted to intercept the key 28. The media protection service 20 may perform the action 60 that protects the media 32 before the key 28 is invalidated based on the rule 46-1 that was obtained by the media protection service 20 from the data structure 44. Performing the action 60 may include identifying a second QKD protocol 70 in the rule 46-1 as a QKD protocol that can protect the media 32 before the key 28 is invalidated. The quantum communication channel 24 may utilize the second QKD protocol 70. The second QKD protocol 70 may be a different QKD protocol from the QKD protocol 26. For instance, the QKD protocol 26 may be a BB84 QKD protocol and the second QKD protocol 70 may be an E91 protocol, as non-limiting examples. The media protection service 20 can transition the quantum communication channel 24 from using the QKD protocol 26 to using the second QKD protocol 70, such as by sending a message to the sending entity and the receiving entity to use the second QKD protocol 70.

Figure 6:
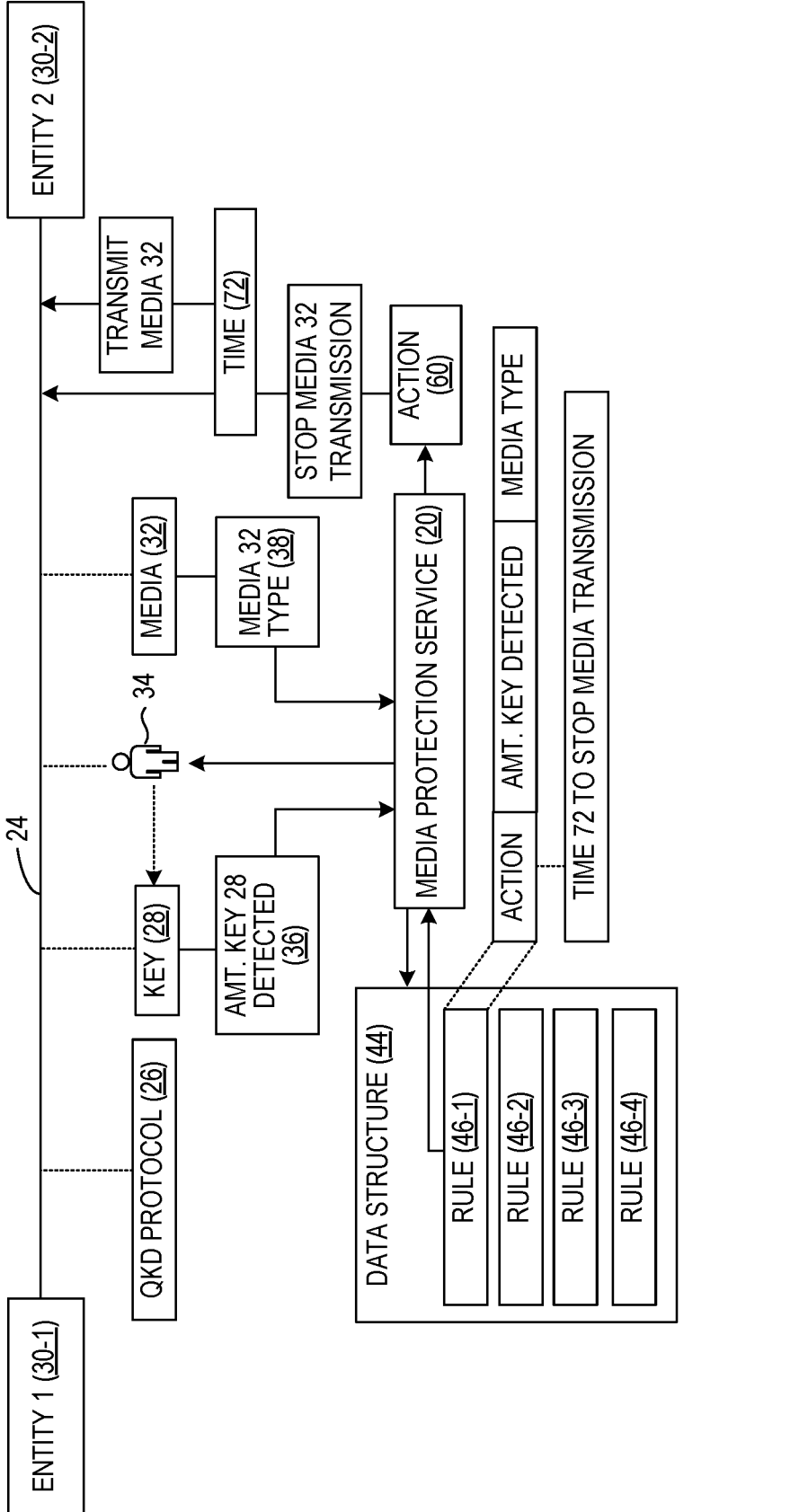
FIG. 6 is a block diagram of the quantum computing system of FIG. 1 for media stream transmission protection through QKD networks, according to one example.

FIG. 6 is a block diagram of the quantum computing system of FIG. 1 for media stream transmission protection through QKD networks, according to one example. Elements of FIG. 1 are referenced in describing FIG. 6 for the sake of clarity. In the example of FIG. 6, the media 32 may be in the process of being transmitted over the quantum communication channel 24 between the first entity 30-1 and the second entity 30-2 when the media protection service 20 determines that the eavesdropper 34 has attempted to intercept the key 28. The media protection service 20 may perform the action 60 that protects the media 32 before the key 28 is invalidated based on the rule 46-1 that was obtained by the media protection service 20 from the data structure 44. Performing the action 60 may include identifying in the rule 46-1 a predetermined amount of time 72 to stop transmitting media over the quantum communication channel 24. The media protection service 20 can stop the transmission of the media 32 between the first entity 30-1 and the second entity 30-2 over the quantum communication channel 24 for the predetermined amount of time 72. The predetermined amount of time 72 may expire and the media protection service 20 may restart the transmission of the media 32 over the quantum communication channel 24 and continue to transmit the media 32 between the first entity 30-1 and the second entity 30-2 over the quantum communication channel 24. For example, the media protection service 20 may determine that the amount 36 of the key 28 detected is 10% of the key 28 and that the type 38 of the media 32 is a video stream between the first entity 30-1 and the second entity 30-2 over the quantum communication channel 24. The media protection service 20 may access the data structure 44 and obtain the rule 46-1 for when 10% of a key was detected and the media type is a video stream. The rule 46-1 may instruct the media protection service 20 to stop transmitting the media 32 between the first entity 30-1 and the second entity 30-2 over the quantum communication channel 24 for 1 hour or to stop all communications over the quantum communication channel 24 for 1 hour. After 1 hour passes, the media protection service 20 can restart the transmission of the video stream and other communications between the first entity 30-1 and the second entity 30-2 over the quantum communication channel 24.

Figure 7:
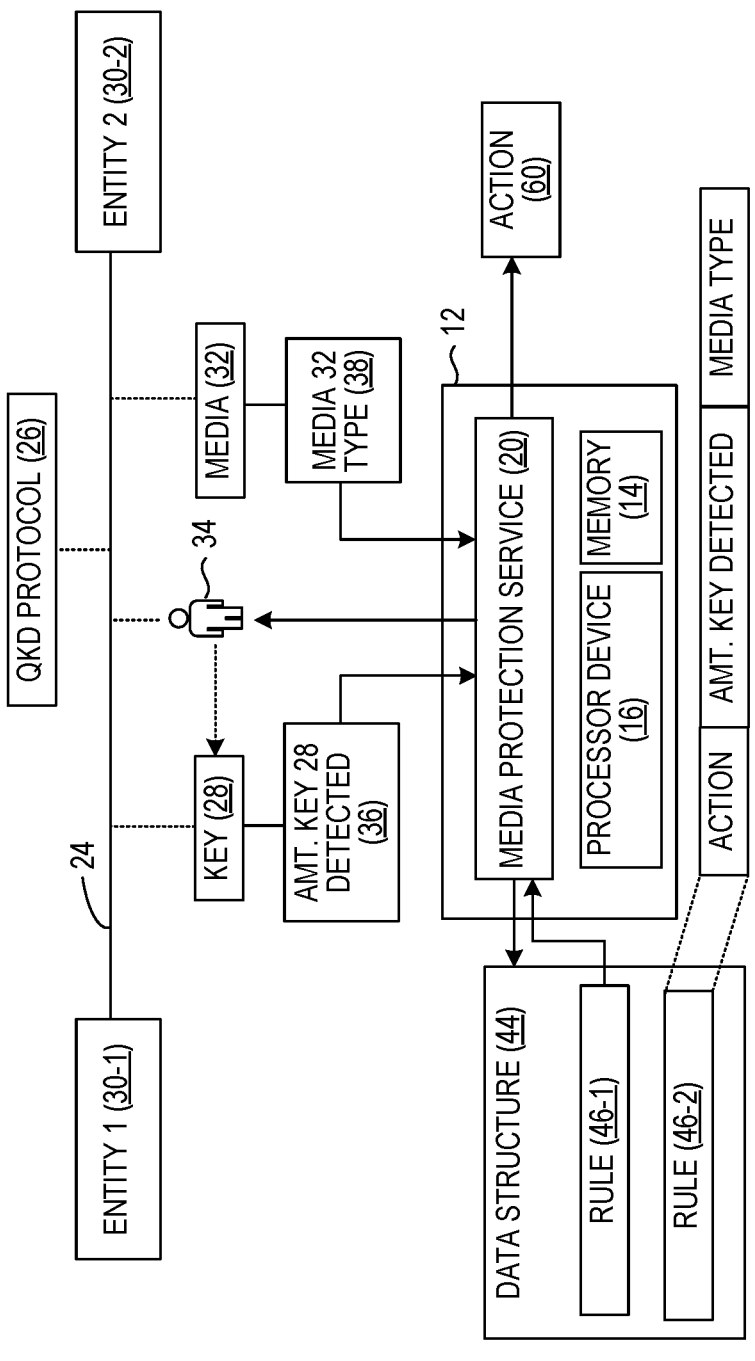
FIG. 7 is a block diagram of the quantum computing system of FIG. 1 for media stream transmission protection through QKD networks, according to one example.

FIG. 7 is a block diagram of the quantum computing system of FIG. 1 for media stream transmission protection through QKD networks, according to one example. Elements of FIG. 1 are referenced in describing FIG. 7 for the sake of clarity. In the example of FIG. 7, a quantum computing device 12 comprises a system memory 14 and a processor device 16 coupled to the system memory 14. The processor device 16 is to determine that an eavesdropper 34 has attempted to intercept a key 28 on a first quantum communication channel 24 that is using a first quantum key distribution (QKD) protocol 26, wherein media 32 is being transmitted over the first quantum communication channel 24 between a first entity 30-1 and a second entity 30-2. The processor device 16 is further to access a data structure 44 comprising a plurality of rules 46-1, 46-2, 46-3, 46-4, each rule identifying an action to take based on an amount of a key detected by an eavesdropper and a type of media being transmitted over the first quantum communication channel 24. The processor device 16 is further to obtain, based on an amount 36 of the key 28 detected by the eavesdropper 34 and a type 38 of the media 32, a rule 46-1 from among the plurality of rules 46-1, 46-2, 46-3, 46-4 in the data structure 44. The processor device 16 is further to perform, based on the rule 46-1, an action 60 that protects the media 32 before the key 28 is invalidated.

Figure 8:
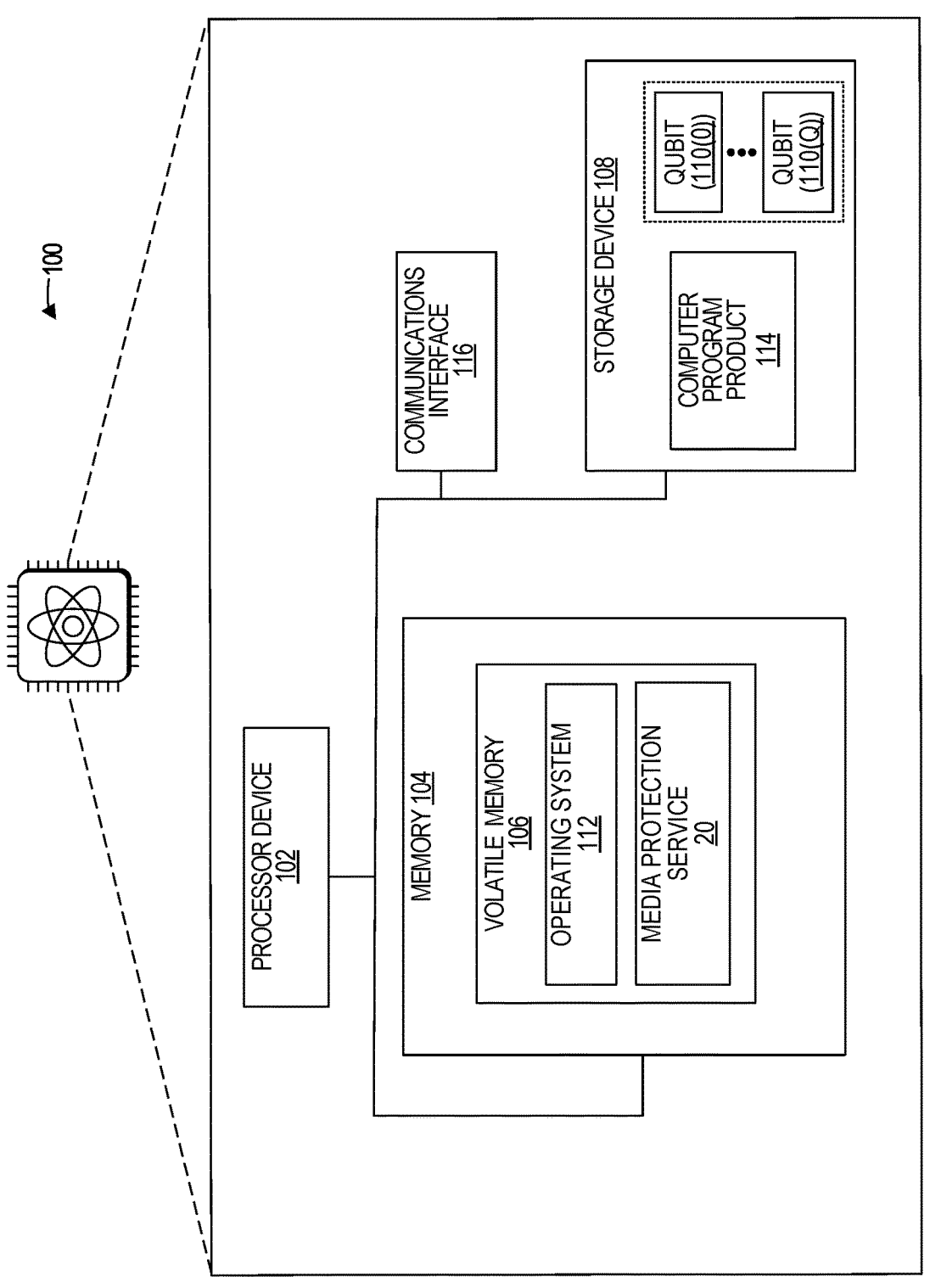
FIG. 8 is a block diagram of a quantum computing device suitable for implementing examples, according to one example.

FIG. 8 is a block diagram of a quantum computing device 100, such as the quantum computing device 12 of FIG. 1, suitable for implementing examples according to one example. The quantum computing device 100 may comprise any suitable quantum computing device or devices. The quantum computing device 100 can operate using classical computing principles or quantum computing principles. Thus, in some implementations, portions of the quantum computing device 100 (e.g., the media protection service 20) may be executed using classical computing components and/or algorithms. When using quantum computing principles, the quantum computing device 100 performs computations that utilize quantum-mechanical phenomena, such as superposition and entanglement. The quantum computing device 100 may operate under certain environmental conditions, such as at or near zero degrees (0°) Kelvin. When using classical computing principles, the quantum computing device 100 utilizes binary digits that have a value of either zero (0) or one (1).

The quantum computing device 100 includes a processor device 102, such as the processor device 16 of FIG. 1, and a system memory 104, such as the system memory 14 of FIG. 1. The processor device 102 can be any commercially available or proprietary processor suitable for operating in a quantum environment. The system memory 104 may include volatile memory 106 (e.g., random-access memory (RAM)).

The quantum computing device 100 may further include or be coupled to a non-transitory computer-readable medium such as a storage device 108, such as the storage device 18 of FIG. 1. The storage device 108 may comprise, for example, an internal or external hard disk drive (HDD) (e.g., enhanced integrated drive electronics (EIDE) or serial advanced technology attachment (SATA)) for storage, memory, or the like. The storage device 108 and other drives associated with computer-readable media and computer-usable media may provide non-volatile storage of data, data structures, computer-executable instructions, and the like. The storage device may also provide functionality for storing one or more qubits 110(0)-110 (Q).

A number of modules can be stored in the storage device 108 and in the volatile memory 106, including an operating system 112 and one or more modules, such as the media protection service 20. All or a portion of the examples may be implemented as a computer program product 114 stored on a transitory or non-transitory computer-usable or computer-readable medium, such as the storage device 108, which includes complex programming instructions, such as complex computer-readable program code, to cause the processor device 102 to carry out the steps described herein. Thus, the computer-readable program code can comprise computer-executable instructions for implementing the functionality of the examples described herein when executed on the processor device 102.

An operator may also be able to enter one or more configuration commands through a keyboard (not illustrated), a pointing device such as a mouse (not illustrated), or a touch-sensitive surface such as a display device (not illustrated). The quantum computing device 100 may also include a communications interface 116 suitable for communicating with other quantum computing devices, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
determining, by a quantum computing device, that an eavesdropper has attempted to intercept a key on a first quantum communication channel that is using a first quantum key distribution (QKD) protocol, wherein media is being transmitted over the first quantum communication channel between a first entity and a second entity;
accessing, by the quantum computing device, a data structure comprising a plurality of rules, each rule identifying an action to take based on:
an amount of a key detected by an eavesdropper; and
a type of media associated with the media from a plurality of candidate types of media;

obtaining, by the quantum computing device based on the amount of the key detected by the eavesdropper and the type of media associated with the media, a rule from among the plurality of rules in the data structure; and
performing, by the quantum computing device based on the rule, an action that protects the media before the key is invalidated.

2. The method of claim 1, further comprising:
subsequent to determining that the eavesdropper has attempted to intercept the key on the first quantum communication channel, determining the amount of the key detected by the eavesdropper; and
determining the type of media associated with the media.

3. The method of claim 2, wherein determining the amount of the key detected by the eavesdropper comprises obtaining, from the first QKD protocol, an amount of errors introduced into the key.

4. The method of claim 2, wherein determining the amount of the key detected by the eavesdropper comprises obtaining, from the first QKD protocol, the amount of the key detected by the eavesdropper, wherein the amount of the key detected is a percentage.

5. The method of claim 2, wherein determining the amount of the key detected by the eavesdropper comprises:
sending a request to an API corresponding to the first QKD protocol for an amount of errors introduced into the key; and
receiving, from the API corresponding to the first QKD protocol, the amount of errors introduced into the key, wherein the amount of the key detected by the eavesdropper is based on the amount of errors introduced into the key.

6. The method of claim 1, further comprising:
determining metadata of the media, wherein the metadata comprises one or more of a sender of the media, a receiver of the media, contents of the media, encryption of the media, and sensitivity of the media; and
wherein obtaining the rule from among the plurality of rules in the data structure comprises obtaining the rule from among the plurality of rules in the data structure based on the amount of the key detected by the eavesdropper, the type of media associated with the media, and the metadata of the media.

7. The method of claim 1, further comprising:
subsequent to obtaining, based on the amount of the key detected by the eavesdropper and the type of media associated with the media, the rule from among the plurality of rules in the data structure, determining that the action identified in the rule utilizes a quantum communication channel that is at capacity;
obtaining, based on the amount of the key detected by the eavesdropper and the type of media associated with the media, a second rule from among the plurality of rules in the data structure, wherein the plurality of rules comprise an ordered list of rules and the second rule is second in the ordered list of rules; and
performing, based on the second rule, the action that protects the media before the key is invalidated.

8. The method of claim 1, wherein obtaining, based on the amount of the key detected by the eavesdropper and the type of media associated with the media, the rule from among the plurality of rules in the data structure comprises identifying, in the data structure, a rule that corresponds to the type of media associated with the media and the amount of the key detected by the eavesdropper.

9. The method of claim 1, wherein performing, based on the rule, the action comprises:

identifying, in the rule, a second quantum communication channel that protects the media before the key is invalidated; and transitioning transmission of the media from the first quantum communication channel to the second quantum communication channel between the first entity and the second entity.

10. The method of claim 9, further comprising:

subsequent to transitioning the transmission of the media from the first quantum communication channel to the second quantum communication channel, stopping the first quantum communication channel.

11. The method of claim 9, wherein transitioning the transmission of the media from the first quantum communication channel to the second quantum communication channel comprises:

determining a sender of the media, wherein the sender of the media is the first entity or the second entity;

determining a receiver of the media, wherein the receiver of the media is the first entity or the second entity that is not the sender of the media; and sending a message to the sender of the media and the receiver of the media to transition the transmission of the media from the first quantum communication channel to the second quantum communication channel.

12. The method of claim 9, wherein transitioning the transmission of the media from the first quantum communication channel to the second quantum communication channel comprises:

determining that a first portion of the media was transmitted over the first quantum communication channel between the first entity and the second entity, and a second portion has not been transmitted over the first quantum communication channel between the first entity and the second entity;

transitioning the transmission of the second portion of the media from the first quantum communication channel to the second quantum communication channel; and transmitting the second portion of the media over the second quantum communication channel between the first entity and the second entity.

13. The method of claim 1, wherein performing, based on the rule, the action comprises:

identifying, in the rule, a second QKD protocol that protects the media before the key is invalidated; and transitioning the first quantum communication channel from using the first QKD protocol to using the second QKD protocol.

14. The method of claim 1, wherein performing, based on the rule, the action comprises:

identifying, in the rule, a predetermined amount of time to stop transmitting media over the first quantum communication channel;

stopping transmission of the media over the first quantum communication channel between the first entity and the second entity for the predetermined amount of time; and subsequent to expiration of the predetermined amount of time, transmitting the media over the first quantum communication channel between the first entity and the second entity.

15. A quantum computing device, comprising:

a memory; and a processor device coupled to the memory, the processor device to:

determine that an eavesdropper has attempted to intercept a key on a first quantum communication channel that is using a first quantum key distribution (QKD) protocol, wherein media is being transmitted over the first quantum communication channel between a first entity and a second entity;

access a data structure comprising a plurality of rules, each rule identifying an action to take based on:

an amount of a key detected by an eavesdropper; and a type of media associated with the media from a plurality of candidate types of media;

obtain, based on the amount of the key detected by the eavesdropper and the type of media associated with the media, a rule from among the plurality of rules in the data structure; and perform, based on the rule, an action that protects the media before the key is invalidated.

16. The quantum computing device of claim 15, wherein the processor device is further to:

subsequent to determining that the eavesdropper has attempted to intercept the key on the first quantum communication channel, determine the amount of the key detected by the eavesdropper; and determine the type of media associated with the media.

17. The quantum computing device of claim 15, wherein the processor device is further to:

determine metadata of the media, wherein the metadata comprises one or more of a sender of the media, a receiver of the media, contents of the media, encryption of the media, and sensitivity of the media; and wherein to obtain the rule from among the plurality of rules in the data structure, the processor device is further to obtain the rule from among the plurality of rules in the data structure based on the amount of the key detected by the eavesdropper, the type of media associated with the media, and the metadata of the media.

18. A non-transitory computer-readable storage medium that includes computer-executable instructions that, when executed, cause one or more processor devices to:

determine that an eavesdropper has attempted to intercept a key on a first quantum communication channel that is using a first quantum key distribution (QKD) protocol, wherein media is being transmitted over the first quantum communication channel between a first entity and a second entity;

access a data structure comprising a plurality of rules, each rule identifying an action to take based on:

an amount of a key detected by an eavesdropper; and a type of media associated with the media from a plurality of candidate types of media;

obtain, based on the amount of the key detected by the eavesdropper and the type of media associated with the media, a rule from among the plurality of rules in the data structure; and perform, based on the rule, an action that protects the media before the key is invalidated.

19. The non-transitory computer-readable storage medium of claim 18, wherein the instructions are further to cause the processor device to:

subsequent to determining that the eavesdropper has attempted to intercept the key on the first quantum communication channel, determine the amount of the key detected by the eavesdropper; and determine the type of media associated with the media.

20. The non-transitory computer-readable storage medium of claim 18, wherein the instructions are further to cause the processor device to:

determine metadata of the media, wherein the metadata comprises one or more of a sender of the media, a receiver of the media, contents of the media, encryption of the media, and sensitivity of the media; and wherein to obtain the rule from among the plurality of rules in the data structure, the instructions further cause the processor device to obtain the rule from among the plurality of rules in the data structure based on the amount of the key detected by the eavesdropper, the type of media associated with the media, and the metadata of the media.

\* \* \* \* \*